Sept. 29, 1953

T. F. REEVES 2,653,795

EXCAVATOR

Filed April 24, 1950

INVENTOR.
THOMAS F. REEVES,
BY
Allen & Allen
ATTORNEYS.

INVENTOR.
THOMAS F. REEVES,
BY Allen & Allen
ATTORNEYS.

Sept. 29, 1953     T. F. REEVES     2,653,795
EXCAVATOR
Filed April 24, 1950             6 Sheets-Sheet 3
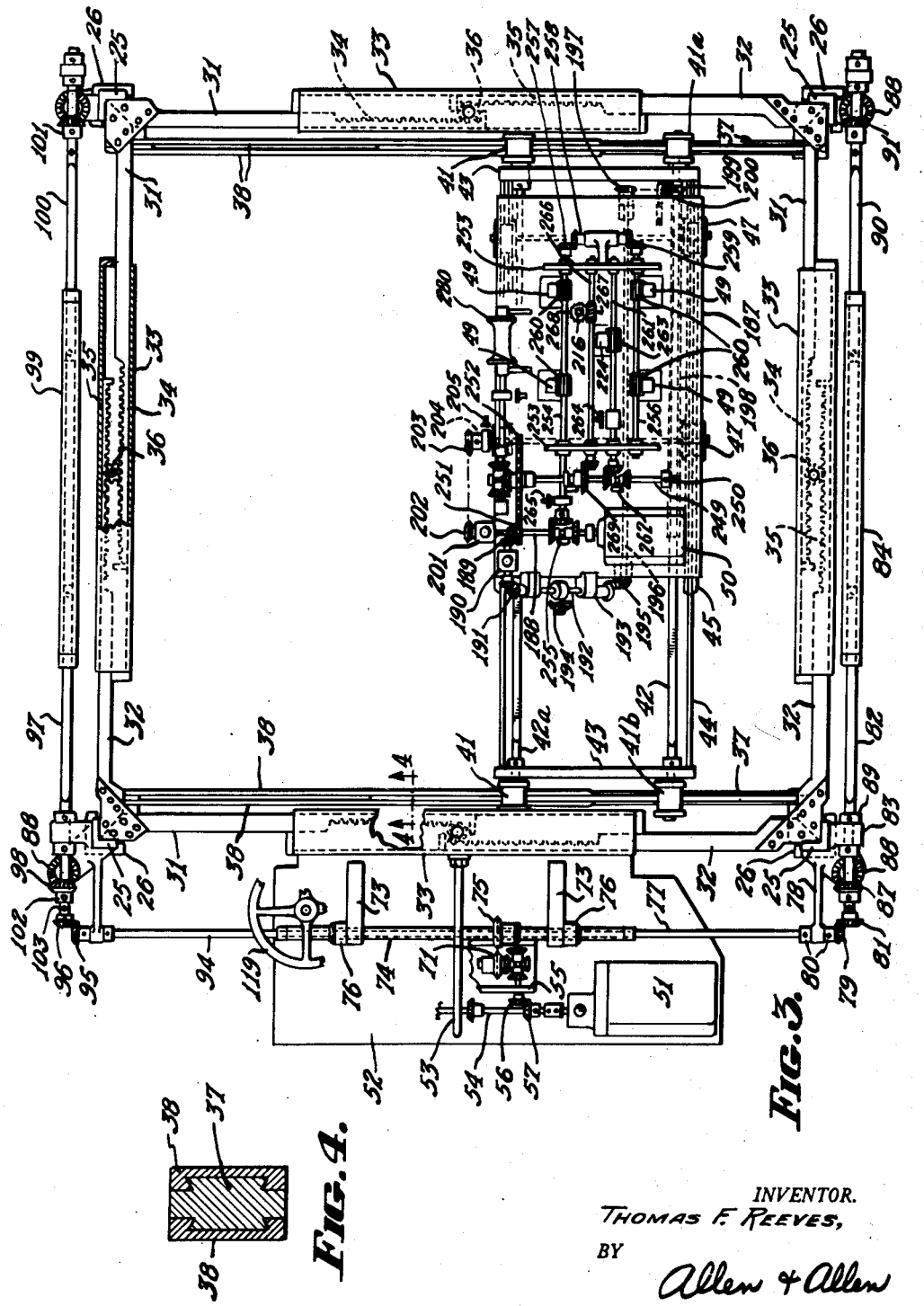
INVENTOR.
THOMAS F. REEVES,
BY
Allen & Allen
ATTORNEYS.

Sept. 29, 1953     T. F. REEVES     2,653,795
EXCAVATOR
Filed April 24, 1950     6 Sheets-Sheet 4
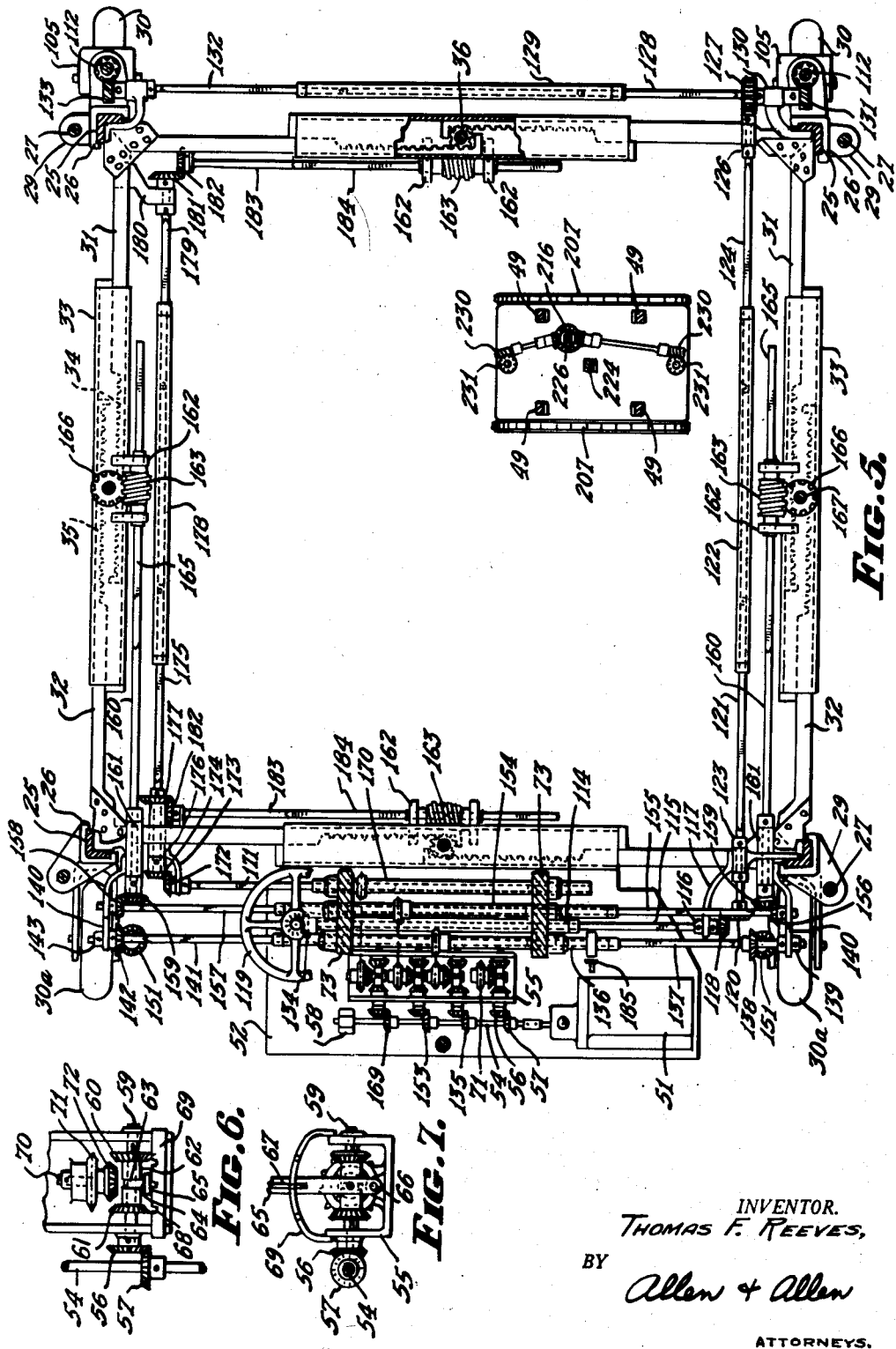
INVENTOR.
THOMAS F. REEVES,
BY Allen & Allen
ATTORNEYS.

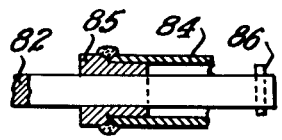  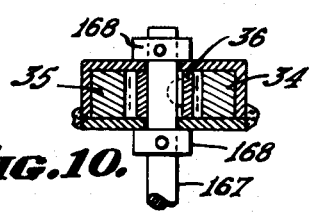 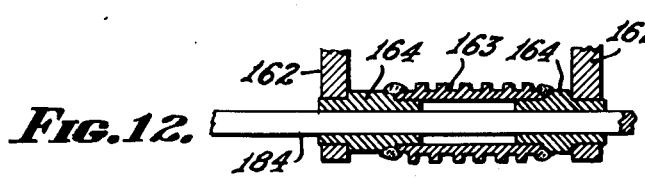 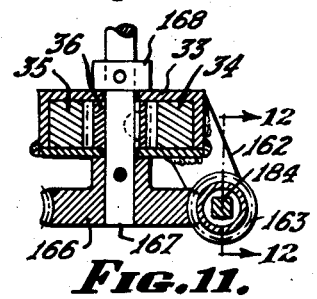 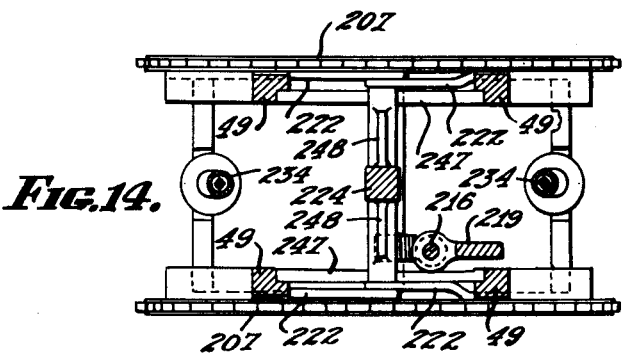 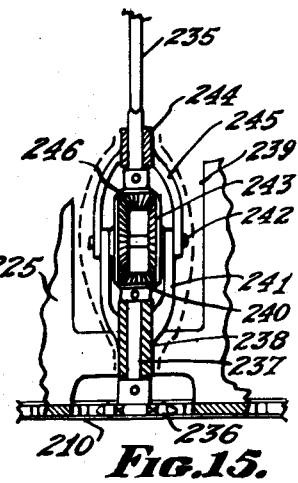 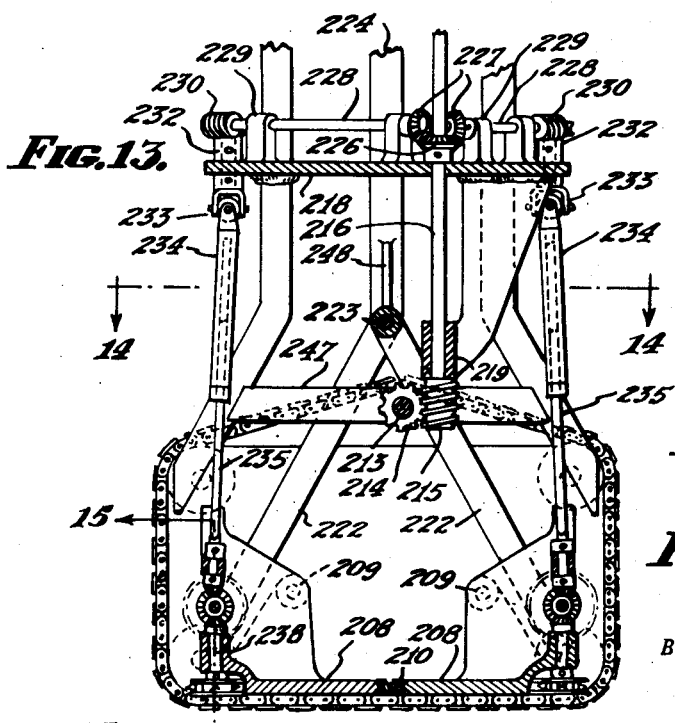 

Sept. 29, 1953 — T. F. REEVES — 2,653,795
EXCAVATOR
Filed April 24, 1950 — 6 Sheets-Sheet 6

INVENTOR.
THOMAS F. REEVES,
BY
Allen & Allen
ATTORNEYS.

Patented Sept. 29, 1953

2,653,795

UNITED STATES PATENT OFFICE 2,653,795

EXCAVATOR

Thomas F. Reeves, Cincinnati, Ohio

Application April 24, 1950, Serial No. 157,827

5 Claims. (Cl. 255—1)

This invention relates to excavators, and particularly to new and useful improvements in machinery for digging graves.

It is an object of my invention to provide an excavator which may be moved from place to place under its own power and without difficulty even though the terrain be varied and strewn with obstructions.

It is another object of my invention to provide an excavator which is adapted to dig excavations of varying size.

A further object of my invention is to provide an excavator which is capable of making excavations in rocky land as well as in sand and marsh lands.

More specifically it is an object of my invention to provide a digging machine comprising a frame that can be expanded and contracted both longitudinally and laterally, on which frame is mounted a digging element which can be moved both longitudinally and laterally. Also, both the frame and digging element are capable of being moved vertically.

Other objects and advantages of my invention will become apparent to one skilled in the art during the course of the following description in which reference is made to the accompanying drawings wherein:

Figure 3 is a plan view with parts removed and parts broken away.

Figure 4 is an enlarged section on the line 4—4 of Figure 3.

Figure 5 is a sectional plan view on the line 5—5 of Figure 1.

Figure 6 is an enlarged detail plan view of a reversible drive arrangement.

Figure 7 is a front elevation of the arrangement shown in Figure 6.

Figure 8 is an enlarged sectional view taken on the line 8—8 of Figure 1.

Figure 9 is a sectional view taken on the line 9—9 of Figure 8.

Figure 10 is an enlarged sectional view taken on the line 10—10 of Figure 2.

Figure 11 is an enlarged sectional view taken on the line 11—11 of Figure 2.

Figure 12 is a sectional view taken on the line 12—12 of Figure 11.

Figure 13 is an enlarged sectional view taken on the line 13—13 of Figure 1.

Figure 14 is a sectional view taken on the line 14—14 of Figure 13.

Figure 15 is an enlarged sectional view taken on the line 15—15 of Figure 13.

Figure 16 is a fragmentary perspective view of a cutter chain employed with my device.

Figure 17 is a perspective view of an alternate type of cutter chain.

General arrangement

In general my digging machine comprises a rectangular frame which may be expanded and contracted both laterally and longitudinally. At each corner this frame is provided with legs which may be raised and lowered either simultaneously or individually. In addition, the frame is provided with two carriages mounted one on top of the other and adapted to be moved at right angles to one another. To this end the lower carriage is mounted for rolling movement on members carried by the frame and arranged to expand and contract therewith. The upper carriage is mounted for rolling movement on rails carried by the lower carriage, these rails also being adapted to expand and contract along with the frame. The digging element is suspended from this upper carriage and, therefore, it will be understood that such element may be moved to any position above the ground included within the area described by the basic frame members of my machine.

In connection with the features outlined above, I provide one motor by means of which I can effect the various changes in my frame and another motor by means of which I control the movement of the carriages and the operation of the digging element per se, including the operation of the cutting plates and chains.

General description

Figure 1:
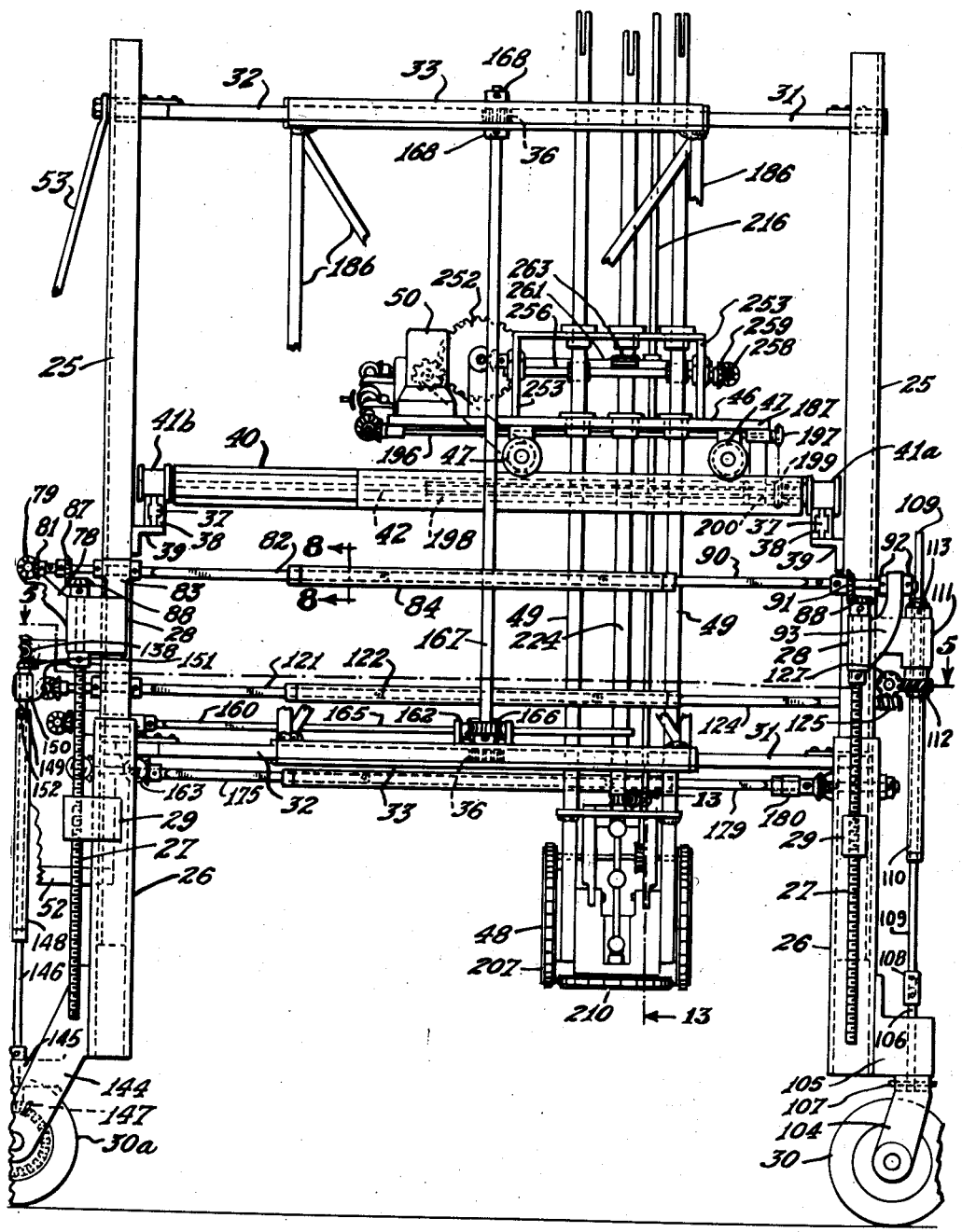
Figure 1 is a side elevation of my excavator.

Referring now to the drawings, especially Figures 1, 2, 3 and 5, I shall more particularly describe the general arrangement of my excavator as above outlined. Each of the four corner posts of my machine comprises a pair of angle members 25 and 26 which telescope one within the other. These telescoping members are maintained in desired position by means of a screw 27 which is journaled in a bearing 28 fixed to the upper post member 25, the lower end of this screw passing through a nut 29 fixed to the lower post member 26. A wheel 30 is mounted in bearings fixed to the members 26. As seen in Figure 1 and as will be described in detail at another point in this specification, a pair of the wheels are mounted in such manner that they may be turned to effect steering of the machine while the other pair of wheels are mounted so as to be driven by one of the motors provided in the machine. One of the driven wheels is shown at the left side of Figure 1, while one of the front wheels is shown at the right side of Figure 1. It will be understood that each corner post is generally similar to the ones just described.

Extending between successive pairs of posts or beams 25 are pairs of cross beams 31 and 32, the inner ends of which are provided with racks which engage one another within a sleeve member 33. An upper and lower set of such members 31, 32 and 33 is provided between the successive pair of post members 25. The racks 34 and 35, which are integral with the members 31 and 32 respectively, are engaged by gears 36 and it will be understood that expansion and contraction of the frame of my machine is obtained by rotating the gears 36 in one direction or another as desired and as will be described more fully shortly.

As so far described my machine comprises a frame made up of adjustable corner posts 25—26 and held in desired position by screw means 27, 28 and 29, the upper portions 25 of these posts being successively joined together by upper and lower sets of cross beams 31 and 32 which may be expanded and contracted by means of racks 34 and 35 engaged by a gear 36. As is best seen in Figures 1 and 3, I have provided a pair of rails extending between a pair of opposite sides of my machine. These rails are comprised of three members, the center one of which is indicated at 37 and provided with a double dove tail engaging a pair of mating track members 38. These rail or track members 37—38 are mounted on brackets 39 fixed to the post 25. This dove tail arrangement permits the rail to expand and contract with the corresponding movement of frame members 31 and 32.

The first of the two carriages above mentioned is adapted to ride on the pair of rails just described. Such carriage is generally indicated at 40 in Figure 1. The carriage 40 is supported by flanged wheels 41, opposite pairs of which have telescoping axles 42 journaled in bearing beams 43. Fixed between the pair of bearing beams 43 are a pair of rail or track members 44—45 arranged in a manner similar to that of the track 37—38 just described. The second carriage, indicated generally at 46, is adapted to ride on the rails 44—45.

The carriage 46 is mounted on wheels 47 which ride on the rails 44—45. From this second carriage I support two of the basic elements of my excavator, one of them being the digging element generally indicated at 48, it being supported by means of a plurality of racks 49, and the motor 50 which furnishes the motivating power for both of the carriages 40 and 46, and for the digging element 48.

The motor by means of which the excavator is moved from place to place and by means of which the posts 25—26 are moved with respect to one another, and by means of which the members 31 and 32 are expanded or contracted, is indicated at 51. This motor is mounted on a platform 52 supported from the frame by means of a connection with one of the members 33 and a tie rod 53 (see Figure 1).

Having now described the general arrangement of my machine, and having given a brief but general description of the same, I shall now proceed with a specific description of the various mechanisms hereinbefore referred to, and a fuller description of the actual operation of my machine.

Frame elevating mechanism

As hereinbefore described, each of the corner posts of my machine comprises a pair of angle members 25 and 26, adapted to slide relative to one another vertically as determined by a screw 27. I shall now describe how each of these screws may be driven. Referring to Figures 3 and 5, it will be observed that the motor 51 is provided with a long drive shaft 54, on which are mounted a series of gears whose functions will be further described shortly. Also supported from the platform 52 is a stand 55 in which are mounted a plurality of reversible gears designed to cooperate with the gears provided on the drive shaft 54. Each set of reversible gears may be constructed as shown in enlarged detail in Figures 6 and 7. As so constructed this arrangement comprises a bevel gear 56 meshing with a bevel gear 57 provided on the drive shaft 54, which shaft has a bearing in a member 58 provided at one end of the platform 52. The bevel gear 56 is fixed to a shaft 59 which is journaled in the sides of the stand 55. Within the sides of stand 55 I have provided a pair of gears 60 and 61 which are fixed to a common sleeve 62, the sleeve 62 being splined to the shaft 59. The sleeve 62 is provided with a groove 63 adapted to receive a pin 64 which is carried by a lever 65, this lever being pivoted to the bottom of stand 55 as indicated at 66. The lever 65 is provided with a lug 67 adapted to engage notches 68 provided in the band 69. Also mounted within the sides of stand 55 is a short shaft 70 which carries a sprocket 71 and a gear 72. The gear 72 is adapted to mesh with either of the gears 60 or 61 depending on the position of lever 65. By shifting this lever either to the right or left as seen in Figure 6, one of the gears 60 or 61 will be brought into engagement with the gear 72 and rotary movement thus imparted to the sprocket 72, it being noted that shafts 54 and 59 will be moving at all times the motor 51 is turned on.

Mounted in a pair of bearing stands 73 fixed to the platform 52, are a plurality of tubes, one of which is indicated at 74 in Figure 3. A sprocket 75 is fixed to the tube 74, this sprocket being connected with the sprocket 71 by means of a chain or the like. A pair of collars 76 prevent axial movement of the tube 74.

A shaft 77 slidably engages within one end of the tube 74, it being adapted, however, to rotate with the tube 74. The outer end of shaft 77 has a bearing within an extension 78 fastened to the upper beam 25. At its end the shaft 77 is provided with a gear 79 fixed thereto. The gear 79 is maintained in proper position by means of a pair of collars 80 fastened to the shaft 77 on either side of the extension 78. Gear 79 meshes with a gear 81 fixed to the end of a shaft 82 which is suitably supported by a bearing housing 83 carried by the beam 25. The shaft 82 telescopes within a tube 84 in the same manner as shaft 77 telescopes within tube 74.

As is indicated in Figure 3 and shown in detail in Figures 8 and 9, a satisfactory way of arranging for the telescoping action just mentioned is to form the shaft 82 so that a portion of it is square in cross section. A plug element having a square hole is fixed within the end of tube 84, this element being indicated at 85. A pin 86 in the end of shaft 82 will prevent accidental dislodgment of the shaft 82 from tube 84. In this manner the shaft 82 is free to slide within the tube 84 and at the same time rotate with it. It is to be understood that the connection between members 74 and 77 is similar to this. Such telescoping action is necessary because of the fact that my frame is expandable in the manner above indicated.

Referring again to Figures 1 and 3, it will be seen that the shaft 82 also carries a gear 87, which, in the position shown, meshes with one of the gears 88 provided on one of the screws 27. A pair of collars 89 fixed on the shaft 82 at either side of the housing 83 serves to keep the bevel gears 79 and 81 in proper contact with one another.

In the other end of tube 84 I have provided a shaft 90 which is similar to shaft 82. To the end of shaft 90 I have fixed a gear 91 which, in the position shown in Figures 1 and 3, meshes with another of the gears 88 provided on another of the screws 27. Shaft 90 also engages within tube 84 in the manner shown in Figures 8 and 9, the other end of this shaft being maintained in position by means of a pair of collars 92 provided on either side of an extension 93 of bearing 28.

Referring again to Figure 3, the other end of tube 74 engages with a shaft 94 having a gear 95 meshing with a gear 96 fixed to the end of the shaft 97. Also carried by the shaft 97 is a gear 98 which meshes with another of the gears 88 provided on another of the screws 27. Shaft 97 engages within a tube 99, this tube also receiving a shaft 100. This latter shaft carries a gear similar to that indicated at 91, the hub of this gear being seen at 101. This gear will engage another of the gears 88 fixed on another of the screws 27.

It is to be understood that the arrangement indicated at 94 through 101 is a substantial duplication of the arrangement more fully described in connection with parts 77 through 93. By this arrangement, when the operator actuates lever 65 so as to engage one of the gears 60 or 61 with the gear 72 and the sprocket 71 thus driven, tube 74 will be rotated as will, of course, the shafts 94 and 77. As a result of such rotation, shafts 82, 90, 97 and 100 will also be rotated, the final result being that the screws 27 will be simultaneously actuated through the engagement of gears 88 with the gears 87, 91, 98 and 101. In this manner the frame is either raised or lowered depending on the engagement between gears 61 and 60 with gear 72.

Although I have described the above arrangement so as to indicate that all four of the screws 27 are simultaneously actuated, it should be noted that each of the gears 87, 91, 98 and 101 is so arranged that it may be moved out of contact with its respective gear 88. Thus, as is illustrated in connection with gear 98, the various shafts are provided with a pair of holes adapted to receive a pin placed through a hole 102 in the hub of the said gears. This pin will also engage within one of the holes 103, the gear of course, being otherwise slidable on its shaft. When the operator desires to raise or lower certain of the legs of my machine and not the others, he may simply disengage whichever gears he chooses by means of the simple arrangement just described. Although I have illustrated an arrangement which necessitates the operator going to each gear desired to be disengaged and moving it on its shaft from one position to another, it is to be understood that it is within the scope and spirit of my invention to substitute conventional clutch devices for the arrangement shown and so arrange them that they could be operated from the platform 52 by means of cables or the like.

By reason of the telescoping actions provided for at 74, 84 and 99, the elevating mechanism just described can be utilized regardless of whether the frame is in its laterally and longitudinally expanded or contracted position. Having thus described the mechanism for raising or lowering my machine in order that it may pass over tomb stones or under trees as is desired, I shall now proceed with a description of how my machine may be guided by the operator.

*Front wheel steering mechanism*

Figure 2:
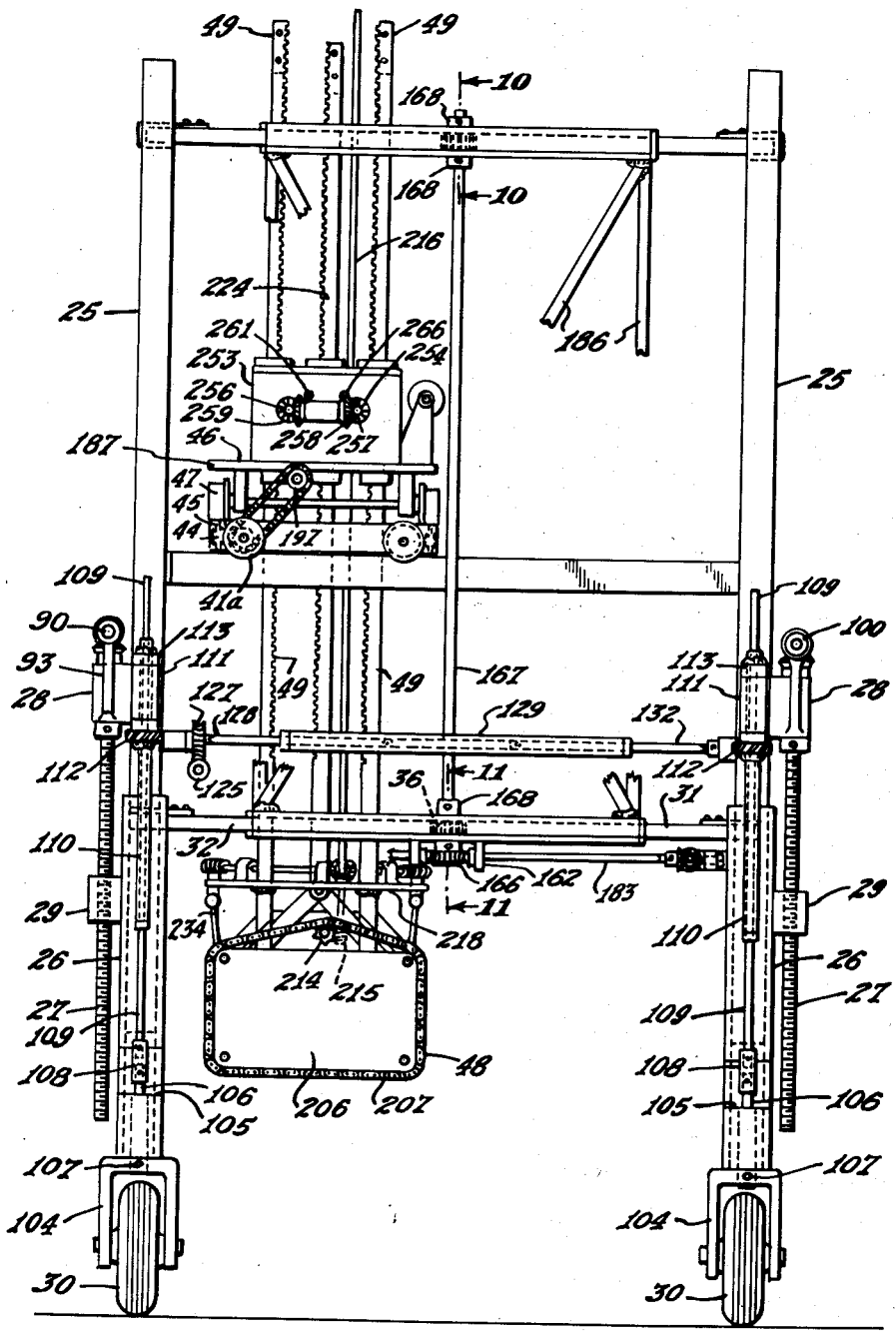
Figure 2 is an elevation taken from the right side of Figure 1.

For the sake of clarity I shall refer to the front wheels as being indicated at 30, and the rear wheels as being indicated at 30a. As best illustrated in Figures 1 and 2, each of the front wheels 30 is mounted on axles carried in bifurcated members 104 positioned beneath bearing extensions 105 fixed to the lower leg portion 26. A shaft 106 extends through the bearing extension 105 and is pinned to the bifurcated member 104 as shown at 107. Each of the shafts 106 is coupled at 108 to a square shaft 109 extending through tube 110 in a manner generally similar to that described in connection with Figures 8 and 9, except in this case the shafts 109 extend clear through the tubes 110. The tubes 110 are journaled within bearing projections 111 which are fixed to the upper leg portions 25. A spiral gear 112 is fixed to the tube 110 beneath the bearing 111, a collar 113 being secured to tube 110 on the other side of bearing 111.

In order that the operator may steer my machine from a convenient point, I provide the following arrangement. Mounted in the bearing stand 73 (see Figure 5), is a tube 114 generally similar to the tube 74 seen in Figure 3. A squared shaft 115 slidably extends within the tube 114. This shaft is maintained in proper position by means of collars 116 provided on either side of a bearing extension 117 suitably fixed to the upper frame portion . A bevel gear 118 is fixed to the end of this shaft. The tube 114 is connected in conventional manner to the steering wheel 119 so that rotation of the steering wheel will produce rotation of bevel gear 118. Gear 118 is arranged to mesh with a gear 120 fixed to the end of a shaft 121 having a slidable engagement within a tube 122. A pair of collars 123 serves to maintain gear 120 in its proper position. Also slidably engaged within the tube 122 is a shaft 124 on the end of which is fixed a worm 125 (see Figure 1). This shaft is also provided with collars 126 in order that the worm 25 be kept in its operative position. It should be observed the tubes 114 and 122 permit driving engagement of the various parts described in spite of any contraction or expansion, lateral or longitudinal, of the frame.

Worm 125 engages a worm wheel 127 carried on a shaft 128 slidably engaged within a tube 129 in a manner similar to that heretofore described in connection with corresponding apparatus. Shaft 128 has a bearing in a dog 130 connected to the upper frame portion 125. At its outer end the shaft 128 is provided with a spiral gear 131 so arranged as to mesh with the gear 112 fixed to the tube 110. Rotation of shaft 128 through the worm drive 125 and 127 will produce corresponding rotation of spiral gear 131, the result being that the tubes 110, and therefore the shafts 109 are turned and steering movement thus imparted to the wheels 30. It is to be understood that a shaft 132 having a gear 133 is arranged in a manner similar to that described in connection with shaft 128 so that the gears 112 are simultaneously engaged by the gears 131 and 133 in order to effect proper turning of the front wheels 30. Having described the means by which an operator may steer an excavator constructed according to my invention, I shall proceed with the description by means of which such a machine may be self powered from place to place.

Back wheel driving mechanism

Referring again to Figure 5, it will be observed that I have provided a second bevel gear 135 fixed to drive shaft 54 of the motor 51. This bevel gear meshes with another bevel gear in a manner similar to that described in connection with gears 56 and 57 and it is to be understood that the arrangement of Figure 6 is repeated between bevel gear 135 and a tube 136 positioned in the bearing stands 73. In this manner tube 136 may be driven from the shaft 54 in either clockwise or counter-clockwise direction depending on the position of another lever similar to that indicated at 65 in Figure 6. The tube 136 is mounted against axial movement within the bearing stands 73 in a manner similar to that described in connection with tube 74 (see Figure 3).

Slidably extending from one end of tube 136 is a shaft 137 having a gear 138 fixed near its end. The gear 138 is held in proper position by means of collars 139 fixed on either side of a bracket 140 carried by the upper portion of the carriage frame. Similarly a shaft 141 extends from the other end of tube 136, this shaft being provided with a gear 139 held in proper position by means of collars 143, associated with another bracket 140.

Referring again to Figure 1, it will be noted that the back wheels 30a are mounted on extensions 144 fixed to the lowermost leg portions 26 of the machine frame. Extending through a dog 145 associated with the member 144 is a shaft 146 having a gear 147 mounted at its end, this gear meshing with corresponding teeth provided in conventional manner on the wheel 30a. A shaft 146 slidably extends into a tube 148 in a manner similar to that described throughout this specification. At its upper end the tube 148 is pinned to a shaft 149 which extends through a bearing member 150 fixed to the uppermost leg portion 25. To the upper end of shaft 149 I have fixed a bevel gear 151, the lower end of this shaft being pinned at 152 to the tube 148 as just described. It is to be understood that the arrangement just described is repeated for each of the back wheels 30a.

The gears 138 and 142 engage their respective gears 151 with the result that rotation of tube 136 drives the wheels 30a simultaneously through the gears 151, shafts 149, tubes 148, shafts 146 and gears 147. It should again be pointed out that the drive just described is possible regardless of whether the frame of the machine has been laterally expanded or contracted and regardless of its position of elevation as determined by the means above described. I shall now proceed with the description of those means by which longitudinal expansion of my machine is accomplished.

Longitudinal expansion mechanism

Referring again to platform 52 as seen in Figure 5, it will be observed that I have provided a third bevel gear 153 on the motor drive shaft 54. Between this gear 153 and a tube 154 mounted in the bearing stands 73, I provide means similar to those described in connection with the gear 56 and tube 74, such means being shown in detail in Figures 6 and 7. It will thus be understood that when the operator moves another lever similar to lever 65, rotary movement in one direction or the other will be imparted to the tube 154.

Extending from one end of the tube 154 is a shaft 155 having a gear 156 mounted near its end and having a bearing in the member 140. It is to be understood that this gear is maintained in proper position in a manner similar to that described in connection with gear 138, it being further understood that shaft 155 is slidable within its tube 154. Similarly a shaft 157 and gear 158 are provided at the other end of tube 154.

The gears 156 and 158 mesh with gears 159 provided on the end of shaft 160 suitably mounted in bearings 161.

As earlier mentioned, the frame members themselves comprise beams 31 and 32 having racks 34 and 35 formed integral with their respective ends, these portions being engaged within a sleeve 33 and associated with a gear 36. The members 31 and 32 are fastened at one of their ends to opposite, upper leg members 25. And, as seen in Figure 1, upper and lower sets of these beams are provided.

Extending from each of the sleeves 33 are a pair of lugs 162 in which a worm 163 is mounted. The detail of this construction is shown in Figure 12. As there illustrated the worm 163 is welded to a pair of plug members 164 journaled in the lugs 162. The plug members 164 are provided with square openings so as to receive the squared portion 165 of the shafts 160. The squared portion 165 of the shaft 160 extends clear through the worm 163 and the lugs 162 to in this manner provide for considerable expansion of the frame members 31 and 32.

As best seen in Figures 1 and 5, the worm 163 engages a gear 166 located adjacent, but outside of the sleeve 33. The gear 166 may be located either above or below the sleeve 33 but in any event it is pinned to a shaft which extends through the sleeve, this shaft being designated 167. It is to this shaft 167 that the gear 36 is keyed. Rotation of shaft 165 will actuate the worm 163 and thus cause turning movement of the gear 166 and shaft 167. Rotation of shaft 167 will result in gear 36 being itself rotated and this in turn causes the racks 34 and 35 to be moved relative to one another depending on the direction of rotation of worm 163. Shaft 167 extends to the upper pair of cross members 31 and 32, and it is to the upper end of this shaft that the pinion 36 for these upper members is fastened. A collar 168 serves to properly position the shaft 167. The detail of this arrangement is best seen in Figures 10 and 11 although these figures actually describe the arrangement of Figure 2, in which case the gear 166 is mounted beneath the sleeve 33 rather than above such sleeve as is the case in Figures 1 and 5. It should be observed that the arrangement is essentially the same in either case.

By the arrangement just described I am able to effect expansion and contraction of the longitudinal members 31 and 32 through operation of gear 153, an arrangement similar to Fig. 6, tube 154, shafts 155 and 157, gears 156 and 158, shafts 160 and worms 163. Such longitudinal expansion and contraction is imparted to the upper and lower sets of members 31 and 32 simultaneously by reason of the shaft 167. I shall now proceed with the description of the means by which I obtain expansion and contraction of the lateral members 31 and 32, it being remembered that such means will be generally similar to those just described and that corresponding parts have been designated with like reference numerals.

*Lateral expansion mechanism*

As shown in Figure 5, I provide a fourth gear 169 on the motor drive shaft 54. Mounted in the bearing stands 73 is another tube 170, it being again understood that the connection between gear 169 and tube 170 is generally similar to that shown and described in connection with Figures 6 and 7. Extending from one end of the tube 70 is a shaft 171 carrying a gear 172 at its end and having a bearing in a bearing extension 173 fastened to the upper frame structure. The gear 172 meshes with a gear 174 fixed to the end of a shaft 175 journaled in a bearing 176. Also fixed to the shaft 175 is a gear 177. The shaft 175 has a squared portion which slidably fits within a tube 178. Slidably extending into the other end of tube 178 is a shaft 179 having a bearing in dog 180 and carrying a gear 181 at its end. Each of the gears 177 and 181 mesh with a gear 182 provided on the shafts 183. These shafts 183 have squared portions 184 which slide within the worms 33 in the manner described in connection with the longitudinal expansion mechanism. As best seen in Figures 2, 10 and 11, the upper and lower lateral members 31 and 32 are moved simultaneously through the action of shaft 167 and the pinions 36 carried by it. The various worm, gear and shaft arrangements 163, 166 and 167 and 36, are all associated with the various frame members 31 and 32 in similar manner, and consequently I have designated these arrangements with like reference numerals. Although Figures 10 and 11 actually represent the particular arrangement utilized with the lateral cross members 31 and 32 (see Figure 2), these same figures serve to indicate in detail the type of arrangement employed with the longitudinal cross members 31 and 32 above discussed.

As diagrammatically illustrated in Figure 5, I provide brakes 185 in connection with the various driven tubular members. Also, as is best seen in Figures 1 and 2, I provide braces 186 between the upper and lower sets of sleeves 33 in order to lend more rigidity to my structure.

Figure 22:
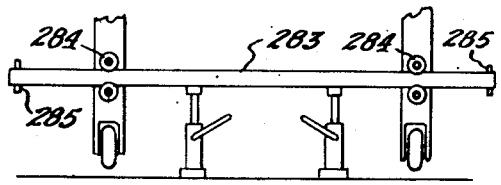
Figure 22 is a semi-diagrammatic view of means which may be employed to aid the lateral expansion of my machine.

In Figure 22 I have illustrated means which may be used to aid the lateral expansion of my machine in the manner just described. This means is particularly well adapted for use with the rear or driven wheels. Each of the rear pair of legs is provided with an opening designed to receive a loose bar 283. Roller bearings 284 in the legs 26 serve to make this bar easier to slide into proper position. At its ends the bar 283 is provided with removable pins 285 which may be inserted to prevent accidental dislodgement of the bar from its operative position. A pair of jacks 286 are adapted to engage the bar 283. By these jacks the machine may be lifted a sufficient distance to raise the wheels 30a from the ground at which time lateral expansion of the machine may be easily effected through gear 169 in the manner just described. A similar arrangement may be used in connection with the front wheels also, if desired.

*Carriage mechanism*

As above indicated I provide two carriages in my machine, the first of which 40, runs transversely of the machine frame on the rails 37, 38. The second carriage is supported by the first and runs longitudinally of my machine on the tracks 44, 45. The rails 37, 38 and tracks 44, 45 are constructed as indicated in Figure 4, so that they may expand and contract along with the main frame of my excavator. The second carriage, generally indicated at 46 in Figure 1, comprises a platform 187 mounted on the wheels 47 and carrying the motor 50. The motor 50 serves to power the carriage 40 as well as the carriage 46, and it also operates the digging mechanism in a manner to be described shortly.

The main drive shaft of motor 50 is indicated at 188. From this shaft, as best seen in Figure 3, I operate various auxiliary shafts to thereby apply power to the mechanism now to be described. Through the bevel gears 189, the reversible drive 190 and bevel gears 191, I drive shaft 192 which is supported from platform 187 by the dogs 193. A brake for this shaft is indicated at 194. The shaft 192, through bevel gears 195, drives another shaft 196 which is supported from the under side of platform 187. At its other end the shaft 196 bears a sprocket 197. The wheel 41a is fixed on a tube 198 generally similar to the other tubes described above. Splined to this tube 198 in a manner which will permit it to slide along the tube and rotate with it, is a sprocket 199 which is chain connected with sprocket 197. This sprocket 199 is moved along the tube 198 by means of a fork 200 depending from the platform 187. The wheel 41b is fixed on a shaft 42 which has a squared portion extending into the tube 198, so that rotation of this tube will also result in the rotation of shaft 42. It is to be understood that the reversible drive indicated at 190 includes a neutral position as well as right and left hand positions, whereby the wheels 41a and 41b are simultaneously driven in a desired direction. While I have shown only the wheels 41a and 41b as being driven, it is within the scope of my invention to drive the other wheels 41 also if desired. Shaft 42a also telescopes into a tube similar to 198 even though it is not driven, and this arrangement, coupled with the telescoping members 44—45, permits the carriage 40 to be operated at all times regardless of whether the frame is in its expanded condition or in its contracted position.

The drive shaft 188 extends into a reversible drive 201 by means of which the rotation of a sprocket 202 is regulated. The sprocket 202 is chain connected to a sprocket 203 fixed to an extension of the shaft 204 on which the wheels 47 are fixed. A brake is diagrammatically indicated at 205. By this arrangement the carriage 46 may be moved in either direction on the tracks 44—45 of the carriage 40. The combination of movements effected by the carriages 40 and 46 enables me to position the platform 187 in any desired spot included within the confines of frame members 31—32. Thus the digging element, which will be particularly described shortly, may be brought to any desired position within this area as it is fixed to the platform 187.

I shall next describe the digging element and then its control mechanism.

*Digging element*

The digging element is supported from platform 187 and carriage 46 by means of four rack members 49. The digging element, generally indicated at 48 in Figures 1 and 2, comprises a pair of side plates 206 having cutting chains 207 placed about their periphery and a pair of end plates 208 pivotally secured to side plates 206 at 209, and having cutting chains 210 associated therewith, this being best seen in Figures 18 and 19.

The side plates 206 are provided with sprockets 211 located at their corners so that the cutting chain 207 may pass thereover. The end plates 208 are similarly arranged. These end plates are pivoted at 209 to the side plates by means of pins extending through webs 212 formed with the plates 208. The cutting chains 207 are driven from a shaft 213 having a worm wheel 214 engaging a worm 215 located on the end of a shaft 216. The drive is completed through sprockets 217 fixed to the ends of shaft 213. The members 49 are welded to a plate 218 and to the inner sides of the plates 206. The shaft 216 has a lower bearing in a lug 219 extending from plate 218.

In Figures 16 and 17 I have shown cutting chains capable of satisfactory operation with my machine. The chain of Figure 16 is provided with carborundum blocks 220 and the chain of Figure 17 is provided with cutting sections 221 which alternately extend to either side of the chain so as to cut a path larger than that defined by the chain proper. The operation of these chains by the shaft 216 will be further described in connection with the discussion of the control mechanism for the digging element to be presented further on in this specification.

As above mentioned the end plates 208 are pivotally connected to the side plates 206. The position of these plates 208 is determined by a pair of scissors 222 pivotally connected at 223 to a control arm 224. When the arm 224 is moved from the position shown in Figure 18, to the position shown in Figure 13, in a manner to be described later, the end plates 208 are moved from their vertical open position to their horizontal closed position, about their pivots 209. It will be understood that the scissor members 222 are pivotally fastened to the portions 212 and 225 so that a closing of the end plates 208 will be effected properly.

Figure 18:
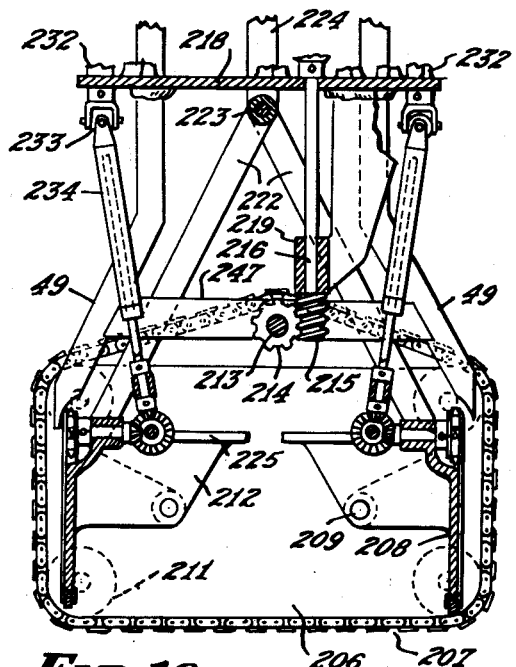
Figure 18 is a sectional view similar to that of Figure 13 but showing the parts in an alternative position.
Figure 19:
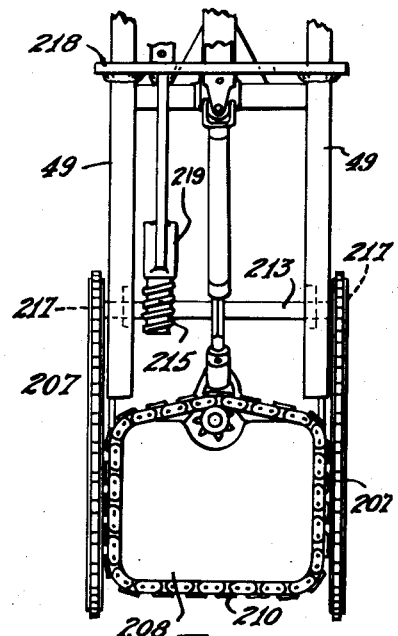
Figure 19 is an elevation from the right side of Figure 18.

Since in operation it is desired that the end plates 208 be in the position shown in Figure 18 as the digging device is lowered into the ground, with both sets of cutting chains 207 and 210 in operation, it is necessary to provide a drive for the cutting chains 210 which will permit these chains to be driven while the scissors 222, are actuated and the claws or end plate 208 brought from the position of Figure 18 to the position of Figure 13. This drive is provided as follows.

*End plate chain drive*

Just above plate 218 the shaft 216 is provided with a gear 226 which meshes with gears 227 provided on a pair of shafts 228. These shafts 228 are supported in bearings 229 located on the plate 218. At their ends the shafts 28 carry worms 230. These worms engage worm wheels 231 (see Figure 5) fixed to members 232 rotatably journaled in the plate 218. Each of the members 232 extends through the plate 218 and at its lower end is provided with the universal joint 233 to which is connected a tube 234.

The tubes 234 are similar to those indicated in Figures 8 and 9 in that the shafts 235 which extend into these tubes are slidable therein and rotatable therewith. The universal joint 233 permits these tubes to be both pivoted and rotated.

The detail of the connection between shafts 235 and chains 210 is best seen in Figure 15. From this figure it will be observed that the chain 210 is driven by a sprocket 236 carried on the end of a shaft 237 having a bearing in an extension 238 of the claw or end plate 208 (see also Figure 13). The portion 225, which is fixed at right angles to the end plate 208, is cut away at 239 in order to make room for the drive about to be described. The other end of shaft 237 bears a bevel gear 240. The bearing 238 is provided with forked extensions 241 in the end of which is mounted a shaft 242. On this shaft I have mounted a pair of bevel gears 243 which mesh with gear 240. Actually, only one of these gears would be necessary, but I find that I secure a more stable arrangement by employing both of them as shown. Also supported from the shaft 242 is a bearing 244 having forked extensions 245. The shaft 235 is maintained within this bearing 244. The forked extensions 245 are free to pivot about the shaft 242. The end of shaft 235 supports a bevel gear 246 which also meshes with the gears 243. This arrangement insures that the gear 246 will at all times be engaged with the gears 243 regardless of the position of end plate 208 and its portion 225 as determined by the scissor arrangement 222—224.

It is thus seen that rotation of shaft 216 results in the driving of chains 207 through the worm 215 and in the driving of chains 210, regardless of their position, through gear 226. Similarly it has been shown that the side plates 206 and the claws 208 pivoted thereto are raised and lowered into the earth by means of the members 49. Also, the opening and closing of the plates or claws 208 has been shown to be controlled by the raising or lowering of control arm 224. Also, as seen in Figures 13 and 14, it should be noted that I have provided bearing members 247 for the shaft 213. These bearing members 247 are welded or otherwise suitably secured between pairs of the arms 49. In addition the juncture between member 224 and the scissors 222 as illustrated by the pin 223 has been strengthened by the provision of ribs 248. I shall now describe the means by which the member 49, control arm 224 and shaft 216 are operated and controlled.

*Control mechanism for digging element*

As best seen in Figure 3, I have provided an auxiliary shaft 249 mounted in bearings 250 on the platform 187. This shaft is driven from the shaft 188 by means of a pair of gears 251 and 252. Mounted on the platform 187 are a pair of bearing stands 253 in which there are supported a plurality of shafts. One of these shafts, 254, is driven from the main drive shaft 188 through a reversible drive 255, this shaft 254 being connected to a shaft 256 through bevel gears 257, an intermediate shaft 258 and bevel gears 259. These shafts 254 and 256 are provided with gears 260 which mesh with the rack portions of members 49. Thus when the shaft 254 is driven in one direction or the other depending on the position of reversible drive 255, the racks 49 are either raised or lowered and the digging element brought out of or into contact with the earth.

Also mounted in the bearing stand 253 is a shaft 261 which is connected to the auxiliary shaft 249 through a reversible drive 262. The shaft 261 is provided with the worm 263 which engages the rack portion of member 224. When the shafts 261 and 254 are in the position indicated in Figure 3, the members 49 and 224 will be actuated together. A brake for shaft 261 is indicated at 264. A brake for shaft 254 is indicated at 265.

Also driven from the auxiliary shaft 249 is a shaft 266 bearing a worm 267 which engages with the worm wheel 268 fixed on the shaft 216. The shaft 216, of course, controls the driving of chains 207 and 210, and therefore I have shown the shaft 266 as being connected to the shaft 249 in such a manner that it will be rotated in only one direction. This connection is indicated at 269 and it is to be understood that it may be engaged or disengaged at the will of the operator and is not dependent on the relative positions of the shafts 254 and 261. Thus at any time the operator wishes to drive the chains, he simply pulls the lever which will bring the shaft 249 into driving relation with the shaft 266 through the connection 269 just mentioned.

Figure 20:
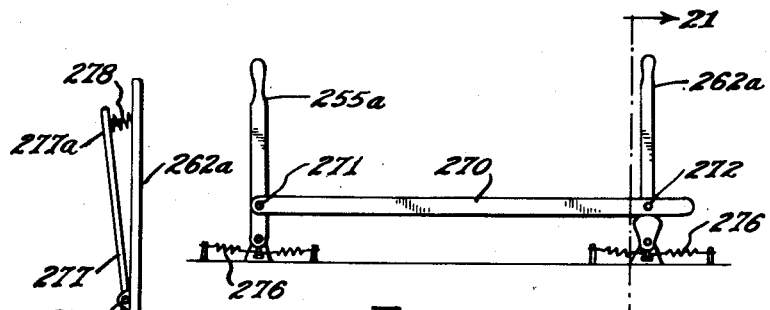
Figure 20 is a semi-diagrammatic view of control mechanism employed in my apparatus.
Figure 21:
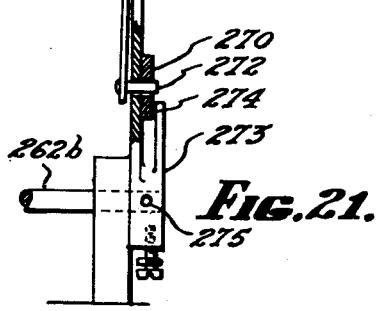
Figure 21 is a sectional view taken from the line 21—21 of Figure 20.

I have, however, provided a linkage between the reversible drives indicated at 255 and 262. This linkage is diagrammatically illustrated in Figures 20 and 21. In these figures the lever 255a is the control lever for reversible drive 255, this being the one which controls operation of members 49, and control lever 262a is that which controls reversible drive 262, this being the drive for member 224. The levers 255a and 262a are joined by a link 270. The link 270 is connected to shaft 255a and 271 and to lever 262a by means of a pin 272. The lever 262a is provided with an enlarged base portion 273 having a slotted portion 274 adapted to receive the link 270. A pin 275 joins the lever 262a to a shaft 262b which controls the operation of the reversible gear arrangement 262. A pair of balancing springs 276 are provided for each of the levers 255a and 262a. When either of the levers 255a or 262a is moved to its right or left hand position as viewed in Figure 20, the other lever is simultaneously moved if pin 272 is engaged as shown in Figure 21.

Fixed to the lever 262a is a bent arm 277 having a spring 278 which normally urges the end 277a away from the lever 262a. In this normal position the pin 272 engages the link 270. When, however, the arm 277 is pivoted about the point 279 against the action of spring 278, the pin 272 is disengaged from the link 270 and the lever 262a may then be moved independently of the lever 255a. By this arrangement the operator is enabled to raise or lower the digging element by employing not only the members 49 but also the member 224. When, however, the side plates 206 and end plates 208 have been driven into the ground to a desired depth, the operator can simultaneously bring both levers to a neutral position, then disengage the pin 272 and thereafter operate the lever 262a as desired. In this way he can secure further downward movement of member 224 with the result that the scissors 222 are actuated and the end plates 208 brought from the position of Figure 18 to that of Figure 13. When the end plates 208 have been brought to the closed position of Figure 13, the operator may move the lever 262a to neutral position and again engage the pin 272 with the link 270 after which he may simultaneously operate all of the members 49 and 224 to raise the digging element and earth contained therein from the ground. In connection with this latter description it should be observed that I have provided sufficient clearance for the digging element 48 to be raised to such a position that its lower edges are at least as far from the ground as are the lower frame members 31 and 32. This arrangement enables me to move my machine over very large objects.

It is within the scope of my invention to employ a reservoir of water maintained under pressure and provided with jets by means of which I may lubricate the various digging chains while in use in heavy ground or rock.

*Review of operations*

In moving this machine from place to place, it is contemplated that the operator will ride on the platform 52 from which platform he may control certain basic functions. Thus the operator will have at his hand a series of levers by which he may raise and lower the machine (the gear 57, tube 74), drive the rear wheels (gear 135, tube 136), effect longitudinal expansion of the machine frame (gear 153, tube 154), effect lateral expansion of the tube frame (gear 169, tube 170), and steer the front wheels 30 (steering wheel 119, tube 114). This arrangement enables the operator to move this machine into and out of places which the ordinary grave digging machine cannot reach. Such a machine is easily negotiated through heavily monumented areas for it can be contracted and expanded, laterally and longitudinally, and raised or lowered at the will of the operator, and in this manner it can be gotten over and around monuments and under trees and similar objects. Furthermore, it is a machine which can be used in varying types of terrain for the legs are individually adjustable as above explained.

After the machine has been brought to the desired location, the operator will leave platform 52 and get up on platform 187 from which platform he can control the operation of the digging element. The position of this digging element is controlled by operation of the reversible gear 190, which, through shafts 192, 196 and tube 198, drives the wheels 41a and 41b of carriage 40. Then, by operation of the reversible gear 201 the operator can position carriage 46, this latter carriage actually carrying the digging element. When this digging element has been properly located by movement of carriages 40 and 46 in the manner just described, the operator will then proceed with the actual grave digging. With the side plates 206 and claws or end plates 208 in the position shown in Figure 18, the operator will lower this digging element to the ground by operation of shafts 254 and 256 (and 261), as controlled by the reversible gears 255 and 262, these gears being connected together by the common linkage shown in Figures 20 and 21. At this point the operator will engage the gear 269 and drive shaft 266, the result being that shaft 216 is rotated and the chains 207 and 210 brought into operation. Continued lowering of the digging element will result in the side chains 207 and end chains 210 digging into the earth and cutting therefrom a sizable chunk. When the member has reached a desired depth, the operator will disengage the reversible gear 255 and actuate the reversible gear 262 independently thereof whereby the member 224 causes the scissor 222 to force the claws inwardly toward each other and the position shown in Figure 13. When fully closed, the operator will again engage the reversible gear 255 and simultaneously operate the gears 255 and 262 to effect a rising of the digging element and dirt contained therein. By repeated operations the operator can dig a hole to the desired depth, the longitudinal and lateral dimensions thereof being controlled by the operator through the means by which he can position the carriages 40 and 46.

In addition to the above described mechanism, I have provided a winch 280 (see Figure 3) operable through a shaft 281, reversible drive 282 and shaft 249. The provision of this winch increases the general utility of my machine.

Not only is a grave digging machine of the type described by me extremely desirable because of its maneuverability, but also because the particular digging element I provide is capable of cutting into substances heretofore considered too difficult, such as hard clay and extremely rocky ground.

It should also be pointed out that the fact that my digging element is supported from the pair of carriages 40 and 46 enables me to effect the digging of graves with a minimum amount of unsightly materials being scattered about. This is possible because, after I have removed a chunk of dirt from the ground, the carriages can be quickly and easily run over to a position above a truck or conveyor which is located beside the grave being dug. The earth removed by my digger can be directly deposited in such a means of conveyance without having to be first piled on the ground. It is the extreme maneuverability of the carriages 40 and 46 coupled with the relatively large area covered by the expandable frame members 31, 32 which makes this convenient operation possible.

It is to be understood that modifications may be made in my invention without departing from the scope and spirit thereof, and although I have shown my invention as embodied in a particular machine, it is to be understood that I do not intend to be limited by the particular structure set forth except insofar as such structure is incorporated in the sub-joined claims.

Having thus described my invention, what I claim as new and desire to be protected by United States Letters Patent is:

1. A digging mechanism for excavators comprising a frame, a pair of side plates fixed in said frame, separate cutting chains disposed about the periphery of each of said side plates, a pair of end plates pivoted to said side plates, separate cutting chains disposed about the periphery of each of said end plates, said end plates normally being disposed in vertical planes, means to operate said cutting chains, and means to move said end plates about their pivotal connection with said side plates to a horizontal position wherein said end plates form a bottom closure for the mechanism.

2. The digging element of claim 1, in which each of said end plates has a leaf extending therefrom at substantially right angles thereto and located so as to form an open-topped box with said side and end plates when said end plates are in horizontal position.

3. An excavator comprising a frame, a carriage movable on said frame and digging mechanism operatively supported from said frame; said digging mechanism comprising a pair of vertically disposed side plates, means to maintain said side plates in fixed position with respect to one another, separate cutting chains disposed about the periphery of each of said side plates, a pair of end plates pivotally connected to said side plates, separate cutting chains disposed about the periphery of each of said end plates, said end plates normally being disposed in vertical planes, means to operate said cutting chains from said carriage, means operable from said carriage to move said end plates about their pivotal connection with said side plates to a horizontal position wherein said end plates form a bottom closure for the mechanism, each of said end plates having a leaf extending therefrom at substantially right angles thereto and located so as to form an open-topped box with said side and end plates when said end plates are in closed horizontal position.

4. The excavator of claim 3, in which the operative support for said digging element comprises a plurality of racks fixed to said side plates and engaged by gears carried by said carriage, a motor mounted on said carriage, and a connection between said motor and gears, said connection including a reversible drive whereby said racks may be raised and lowered as desired.

5. The excavator of claim 4 in which the means for operating said end plates comprises a pair of scissor members pivoted to each other and to said end plates, said scissor members being pivoted to a rack at the point where they are pivoted to each other, said rack engaging a gear driven by said motor whereby the end plates are opened and closed by raising and lowering said rack.

THOMAS F. REEVES.

References Cited in the file of this patent

UNITED STATES PATENTS

| Number | Name | Date |
|---|---|---|
| 537,631 | Cooper | Apr. 16, 1895 |
| 1,016,381 | Watson | Feb. 6, 1912 |
| 1,085,207 | Irby | Jan. 27, 1914 |
| 1,341,138 | Kincade | May 25, 1920 |
| 1,365,748 | Thorn | June 18, 1921 |
| 1,866,037 | Heim et al. | July 5, 1932 |
| 2,406,335 | Kuert | Aug. 27, 1946 |